(12) United States Patent
Arbabian et al.

(10) Patent No.: US 11,885,906 B2
(45) Date of Patent: Jan. 30, 2024

(54) MULTIMODAL SENSING, FUSION FOR MACHINE PERCEPTION

(71) Applicant: Plato Systems, Inc., San Carlos, CA (US)

(72) Inventors: Mohammad Amin Arbabian, San Francisco, CA (US); Upamanyu Madhow, Santa Barbara, CA (US); Babak Mamandipoor, Burlingame, CA (US)

(73) Assignee: Plato Systems, Inc., San Carlos, CA (US)

( * ) Notice: Subject to any disclaimer, the term of this patent is extended or adjusted under 35 U.S.C. 154(b) by 500 days.

(21) Appl. No.: 17/256,564

(22) PCT Filed: Jun. 28, 2019

(86) PCT No.: PCT/US2019/040013
§ 371 (c)(1),
(2) Date: Dec. 28, 2020

(87) PCT Pub. No.: WO2020/006531
PCT Pub. Date: Jan. 2, 2020

(65) Prior Publication Data
US 2021/0156990 A1 May 27, 2021

Related U.S. Application Data

(60) Provisional application No. 62/763,745, filed on Jun. 28, 2018.

(51) Int. Cl.
*G01S 7/295* (2006.01)
*G01S 13/86* (2006.01)
(Continued)

(52) U.S. Cl.
CPC ............ *G01S 7/295* (2013.01); *G01S 13/867* (2013.01); *G01S 13/878* (2013.01);
(Continued)

(58) Field of Classification Search
CPC .... G01S 13/931; G01S 13/867; G01S 13/865; G01S 17/89; G01S 13/86; G01S 17/86;
(Continued)

(56) References Cited

U.S. PATENT DOCUMENTS 6,771,208 B2 * 8/2004 Lutter ..................... G01S 11/12
342/52
6,873,251 B2 * 3/2005 Schiffmann ........... G01S 13/723
340/901

(Continued)

FOREIGN PATENT DOCUMENTS

DE 102010024328 A1 12/2011
DE 102013021568 A1 6/2015
(Continued)

OTHER PUBLICATIONS

U.S. Appl. No. 17/256,544, filed Dec. 28, 2020, Robust Radar-Centric Perception System.
(Continued)

*Primary Examiner* — Olumide Ajibade Akonai
(74) *Attorney, Agent, or Firm* — Schwegman Lundberg & Woessner, P.A.

(57) ABSTRACT

A radar sensor system is provided that includes: multiple sensor units that each includes a radar receiver and a location sensor; and a processor that is configured to use location sensor-based information to determine differences between respective sensor unit nominal locations and respective sensor unit actual locations and to use the determined differences to fuse the radar data received at the radar receivers to produce a wide radar aperture.

26 Claims, 9 Drawing Sheets

(51) Int. Cl.
*G01S 13/87* (2006.01)
*G01S 13/58* (2006.01)
*G01S 13/931* (2020.01)

(52) U.S. Cl.
CPC .......... *G01S 13/582* (2013.01); *G01S 13/931* (2013.01); *G01S 2013/93271* (2020.01); *G01S 2013/93275* (2020.01); *G01S 2013/93276* (2020.01)

(58) Field of Classification Search
CPC ............ G01S 13/89; G01S 17/931; G01S 2013/9322; G01S 2013/93271; G01S 2013/93185; G01S 2013/9319; G01S 2013/9318; G01S 2013/93273; G01S 2013/93272; G01S 13/42; G01S 13/426; G01S 13/06; G01S 2013/9315; G01S 2013/93274; G01S 13/04; G01S 13/726; G06V 20/56; G06V 20/58; G06V 2201/06; G06V 10/757; B60W 2420/52
See application file for complete search history.

(56) References Cited

U.S. PATENT DOCUMENTS

| | | |
|---|---|---|
| 9,423,498 B1 | 8/2016 | Brown |
| 9,547,078 B2 | 1/2017 | Kuehnle et al. |
| 2007/0152870 A1 | 7/2007 | Woodington et al. |
| 2008/0024353 A1 | 1/2008 | Schneider |
| 2011/0199254 A1* | 8/2011 | Bishop .................. G01S 13/867 342/179 |
| 2012/0105268 A1 | 5/2012 | Smits et al. |
| 2014/0152502 A1 | 6/2014 | Nishikata et al. |
| 2015/0192668 A1* | 7/2015 | Mckitterick .......... G01S 17/933 702/159 |
| 2016/0003938 A1 | 1/2016 | Gazit et al. |
| 2016/0195614 A1 | 7/2016 | Tabrikian et al. |
| 2017/0307735 A1* | 10/2017 | Rohani ................. G01S 13/865 |
| 2017/0307746 A1* | 10/2017 | Rohani ................. G01S 13/931 |
| 2018/0203455 A1* | 7/2018 | Cronin ............... G01C 21/3492 |
| 2018/0284265 A1 | 10/2018 | Bilik et al. |
| 2019/0293756 A1 | 9/2019 | Blaes et al. |
| 2019/0377965 A1 | 12/2019 | Totolos, Jr. et al. |
| 2021/0124011 A1 | 4/2021 | Madhow et al. |

FOREIGN PATENT DOCUMENTS

| | | |
|---|---|---|
| DE | 102015012812 A1 | 4/2017 |
| DE | 102016221947 A1 | 5/2018 |
| DE | 102016224573 A1 | 6/2018 |
| WO | WO-2016003474 A1 | 1/2016 |
| WO | WO-2020006531 A1 | 1/2020 |
| WO | WO-2020006533 A1 | 1/2020 |

OTHER PUBLICATIONS

"International Application Serial No. PCT/US2019/040013, International Search Report dated Oct. 8, 2019", 3 pgs.

"International Application Serial No. PCT/US2019/040013, Written Opinion dated Oct. 8, 2019", 9 pgs.

"International Application Serial No. PCT/US2019/040015, International Search Report dated Sep. 24, 2019", 4 pgs.

"International Application Serial No. PCT/US2019/040015, Written Opinion dated Sep. 24, 2019", 8 pgs.

"International Application Serial No. PCT US2019 040015, International Preliminary Report on Patentability dated Jan. 7, 2021", 10 pgs.

"International Application Serial No. PCT US2019 040013, International Preliminary Report on Patentability dated Jan. 7, 2021", 11 pgs.

"U.S. Appl. No. 17/256,544, Non Final Office Action dated Aug. 23, 2023", 18 pgs.

* cited by examiner

MULTIMODAL SENSING, FUSION FOR MACHINE PERCEPTION

CROSS-REFERENCE TO RELATED APPLICATIONS

The present application is a U.S. National Stage Filing under 35 U.S.C. 371 from International Application No. PCT/US2019/040013, filed on Jun. 28, 2019, and published as WO 2020/006531 on Jan. 2, 2020, which application claims the benefit of U.S. Provisional Patent Application, Ser. No. 62/763,745, filed Jun. 28, 2018, entitled, "Methods and Apparatus for Robust Radar-Centric Perception System", which is expressly incorporated herein in its entirety by this reference.

BACKGROUND

Existing advanced autonomy for mobile platforms typically relies heavily on Light Detection and Ranging (LIDAR) systems, which typically provide a high-resolution point cloud representation of the scene. However, LIDAR can be vulnerable to impairments such as fog, snow and rain. Radar, which operates at much larger wavelengths than light, is far more robust to such impairments. However, for a given form factor, a radar unit often provides poorer resolution than LIDAR, since angular resolution depends on the aperture divided by the wavelength.

There has been a need for a radar-centric system with a from factor suitable for autonomy and with improved angular resolution, as well as overall efficacy of perception.

BRIEF DESCRIPTION OF DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

DETAILED DESCRIPTION

Introduction

Multimodal sensor units and associated processing architectures are provided for machine perception. The example machine-based perception system is broadly applicable to a range of applications and scenarios, including various both on-road and aerial vehicles. However, the description here is focused on examples of perception for on-road vehicles, targeting applications ranging from advanced driver assistance systems (ADAS) to full autonomy. As used herein, 'perception' refers to developing a real-time understanding of the environment around developing a real-time understanding of the environment around a mobile platform (e.g., car, boat, aerial drone, robot), such as the relative position and velocity of objects, as well as classification of these objects. Many of the objects of greatest interest are capable of motion, such as pedestrians, bicycles, and vehicles. Important objects that are stationary include curbs, highway barriers, and buildings.

The coordinated operation of multiple radar units deployed at widely separated (relative to the carrier wavelength) locations on the vehicle can help compensate for the poorer resolution of an individual radar unit. Disclosed herein are, (a) individual multi-modal sensor modules for enabling such coordination, including motion compensation and the incorporation of additional sensing modalities such as vision; (b) the deployment of sensor modules on platforms for providing the desired perception capabilities; (c) a processing machine architecture, with local processing at the sensor modules, centralized processing at a fusion unit, and feedback from the fusion unit back to the sensor modules.

Sensor Deployment

Figure 1A:
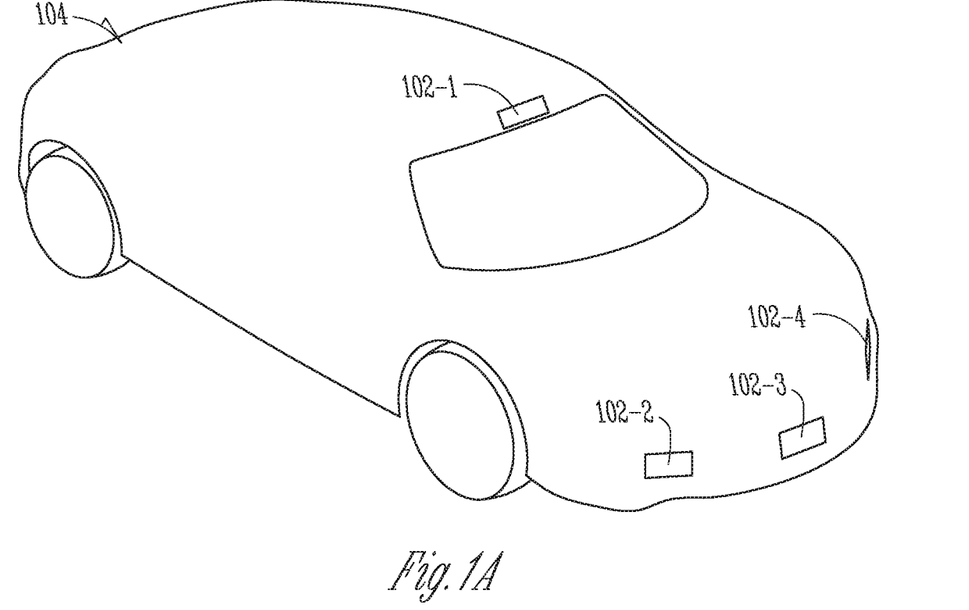
FIG. 1A is an illustrative drawing showing a first example deployment of multiple radar sensor units in a first geometric arrangement for use to synthesize a first large effective radar aperture.
Figure 1B:
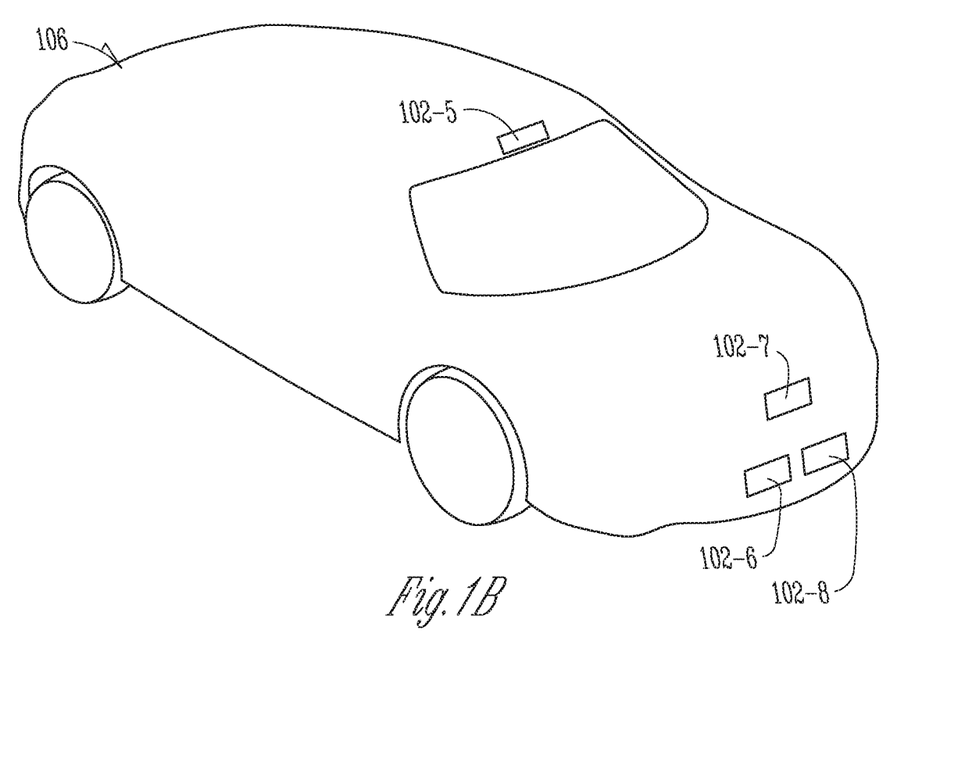
FIG. 1B is an illustrative drawing showing a second example deployment of multiple radar sensor units in a second geometric arrangement for use to synthesize a second large effective radar aperture.

FIG. 1A is an illustrative drawing showing a perspective view of a first example nominal geometric relationship of multiple radar sensor units 102-1 to 102-4 mounted in a first geometric arrangement on a front portion of a first automobile platform 104 for use to synthesize a first large effective radar aperture. FIG. 1B is an illustrative drawing showing a perspective view of a second example nominal geometric relationship of multiple radar sensor units 102-5 to 102-8 mounted in a second geometric arrangement on a front portion of a second automobile platform 106 for use to synthesize a second large effective radar aperture. The sensor units in the first and second geometric arrangements are operably coupled to each other and/or to a centralized processor by high speed communication links, explained below.

Referring to FIG. 1A, in the first geometric relationship, a first sensor unit 102-1 and a third sensor unit 102-3 are located at portions of the first platform 104 that share a common vertical plane, and a second sensor unit 102-2 and a fourth sensor unit s 102-4 are located at portions of the first platform 104 that share a common horizontal plane. The first and third sensor units 102-1, 102-4 are positioned at their locations to face in a forward direction of motion of the first platform 104. The second and fourth sensor units are disposed to face in oblique directions relative to a forward direction of motion of the first platform. The second sensor unit 102-2 is positioned at an acute angle to the right of the forward direction of motion of the first platform 104. The fourth sensor unit 102-4 is positioned to face at an acute angle to the left of the forward direction of motion of the first platform 104. The first sensor unit 102-1 is located at a portion of the first platform 104 that is vertically displaced above the second, third and fourth sensor units that are located in a common share a horizontal plane.

Referring to FIG. 1B, in the second nominal geometric relationship, a fifth sensor unit 102-5 and a seventh sensor unit 102-7 are located at portions of the second platform 106 that share a common vertical plane, and a sixth sensor unit 102-6 and an eighth sensor unit 102-8 are located at portions of the second platform 106 that share a common horizontal plane. The fifth, sixth, seventh and eighth sensor units face in a forward direction of motion of the second platform 106. The seventh sensor unit 102-7 is located at a portion of the second platform 106 that is vertically displaced below the fifth sensor unit 102-5 and that is vertically displaced above the sixth and eighth sensor units 102-6, 102-8.

In an example system, the sensor units are separated by at least 5 radar waveform wavelengths so as to create a larger wide aperture. A larger aperture can provide more scene information, better angular resolution and increased sensitivity to change.

Figure 2:
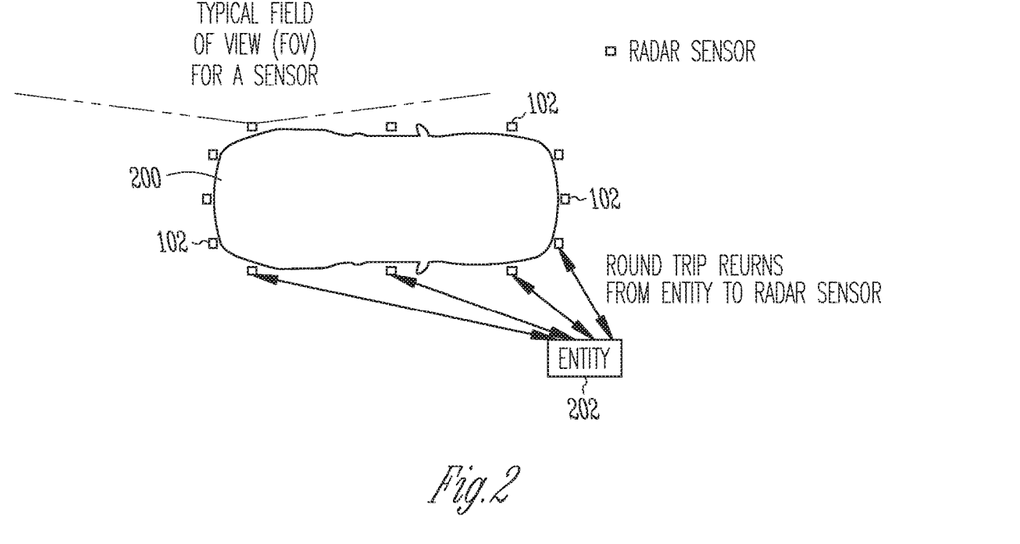
FIG. 2 is an illustrative block diagram showing sensor units mounted along its sides, front, and back portions of a mobile platform.

FIG. 2 is an illustrative block diagram representing a top view of a second mobile platform 200 with sensor units 102 in a nominal geometric relationship mounted along its sides, front, and back portions and showing an object 202 located within the radar fields of view of multiple sensor units 102. The sensor units 102 are operably coupled to each other and/or to a centralized processor (not shown) by high speed communication links. Each sensor unit has a field of view. In the example second platform 300 shown in FIG. 3, multiple sensor units detect the object 302. Roundtrip radar signal returns 304 between the object and multiple sensor units 102 are shown.

Figure 3:
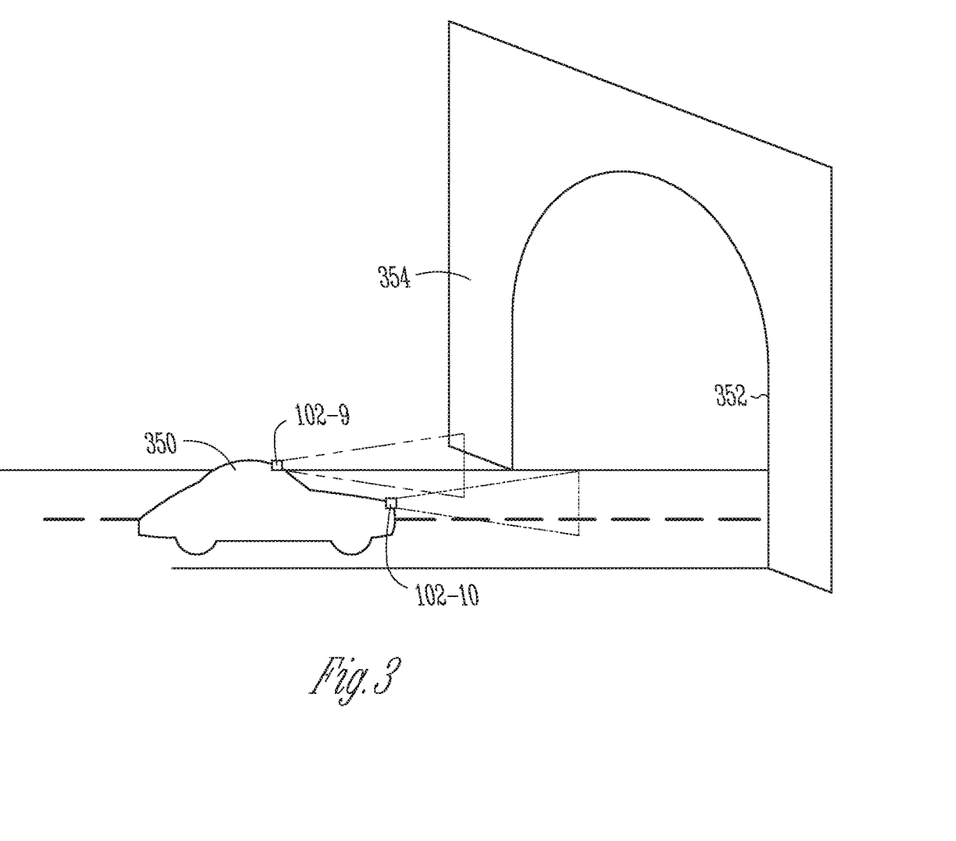
FIG. 3 is an illustrative drawing showing vertical separation among sensor units containing radar elements to achieve better radar resolution along a vertical direction.
Figure 4:
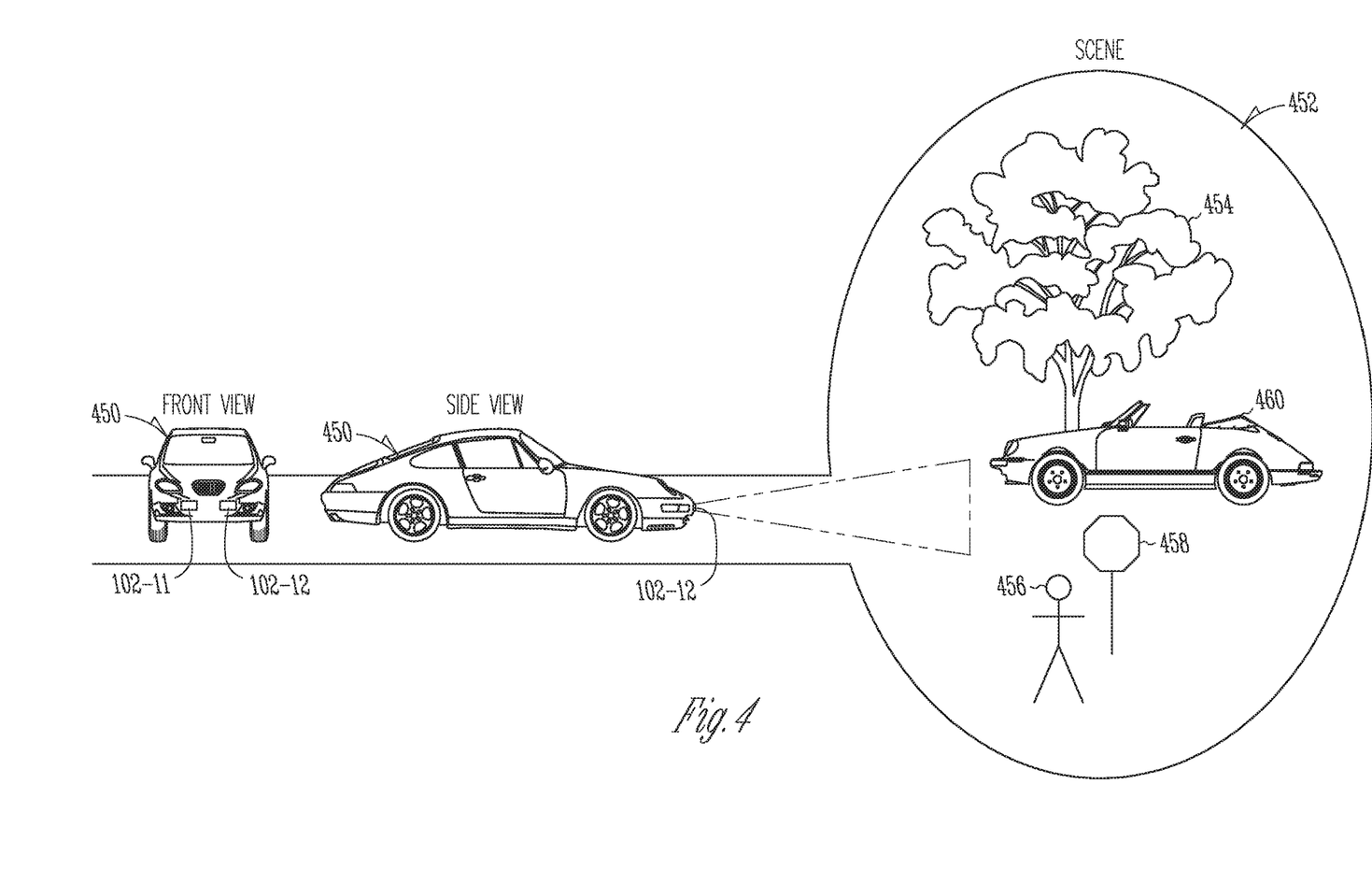
FIG. 4 is an illustrative drawing showing horizontal separation among sensor units containing radar elements to achieve better radar resolution along a horizontal direction.
Figure 5:
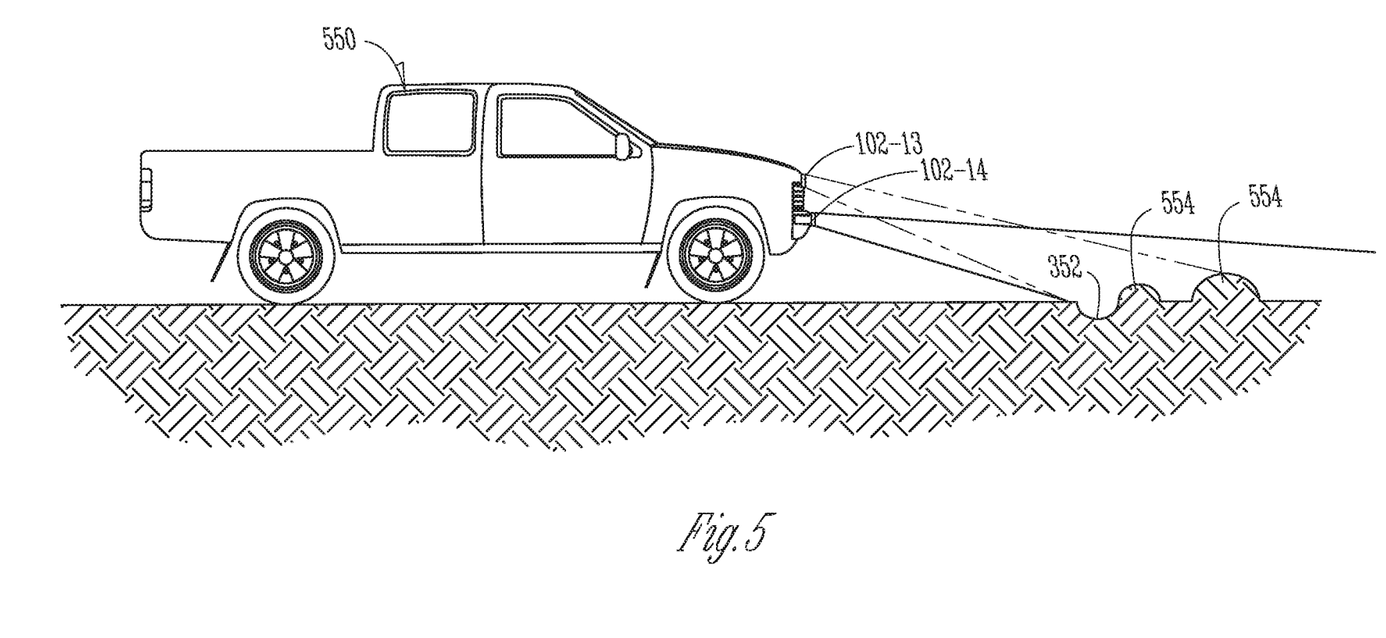
FIG. 5 is an illustrative drawing showing vertical separation among sensor units containing downward-slanted radar elements to achieve to achieve better radar resolution along a downward angled forward direction.

Coordinated operation of radar units in widely separated modules along a large baseline improves resolution and inference across that baseline. The placement of modules is therefore chosen to improve resolution along the relevant axes. FIG. 3 is an illustrative drawing showing vertical separation among sensor units containing radar elements to achieve better radar resolution along a vertical direction. FIG. 4 is an illustrative drawing showing horizontal separation among sensor units containing radar elements to achieve better radar resolution along a horizontal direction. FIG. 5 is an illustrative drawing showing vertical separation among sensor units containing downward-looking radar elements to achieve to achieve better radar resolution along a downward angled forward direction.

Referring to FIG. 3, there is shown a side view of a mobile platform 350 on which vertically separated sensor units 102-9, 102-10 face in a forward direction of motion. Since angular resolution is improved by increasing the separation between sensors, the sensors are separated as widely as possible as permitted by the form factor of the vehicle, and potentially other design considerations such as structural integrity, power dissipation etc. For typical vehicle sizes, it is possible to achieve separation of the order of meters. The mobile platform 350 is shown approaching a tunnel 352 bounded by walls 354. One sensor unit 102-9 is disposed at a higher vertical location on the mobile platform 350 than is the other sensor unit 120-10. In an example placement, the two sensor units 102-9, 102-10 are located at portions of the mobile platform 450 that share a common vertical plane. Moreover, in an example embodiment, one of the sensors 102-9 is tilted upward slightly, at an acute angle to increase the vertical range of the combined sensors units 102-9, 102-10. Each sensor unit has a narrow radar aperture. However, in combination, the two sensor units 102-9, 102-10 provide information indicative of the size and distance of the tunnel opening 302, for example. More particularly, the vertically separated sensors 102-9, 102-10 can provide radar information that, as explained below, a fusion block 412 can use to create a wide radar aperture scene.

Referring to FIG. 4, there are shown side and front views of a mobile platform 450 on which a nominal geometric relationship among sensor units includes horizontally separated sensor units 102-11, 102-12 face in a forward direction of motion. As stated above, since angular resolution is improved by increasing the separation between sensors, the sensors are separated as widely as possible as permitted by the form factor of the vehicle, and potentially other design considerations such as structural integrity, power dissipation etc. The mobile platform 450 is shown approaching a complex scene 452 that includes a tree 454, a pedestrian 456, a sign 458 and a car 460. The two sensor units 102-11, 102-12 are arranged horizontally across the front of the mobile platform 450. In an example placement, the two sensor units are located at portions of the mobile platform 450 that share a common horizontal plane. Each sensor unit has a narrow radar aperture. However, in combination, the two sensor units 102-11, 102-12 provide information indicative of salient objects in the scene 452, for example. More particularly, the horizontally separated sensors 102-11, 102-12 can provide radar information that, as explained below, a fusion block 412 can use to create a wide radar aperture scene.

Referring to FIG. 5, there is shown a side view of a mobile platform 550 in which a nominal geometric relationship of sensor units includes vertically separated sensor units 102-13, 102-14 face in a forward direction of motion and slant downward. The mobile platform 550 is shown approaching a potholes 552 and bumps 554. The two sensor units 102-13, 102-14 are arranged horizontally across the front of the mobile platform 550. In an example placement, the two sensor units are located at portions of the mobile platform 450 that share a common vertical plane. Each sensor unit has a narrow radar aperture. However, in combination, the two sensor units 102-13, 102-14 provide information indicative of the potholes and bumps. More particularly, the horizontally separated sensors 102-13, 102-14 can provide radar information that, as explained below, a fusion block 412 can use to create a wide radar aperture scene.

Multimodal Sensor Unit

Figure 6:
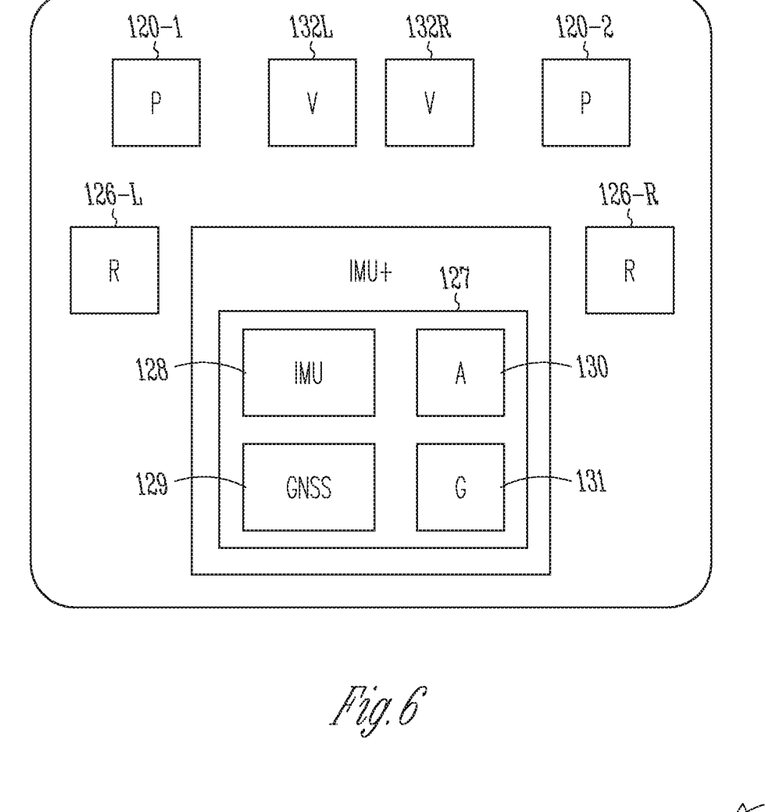
FIG. 6 is an illustrative block diagram showing multiple sensors of an example sensor unit.

FIG. 6 is an illustrative block diagram showing multiple sensor modes of an example sensor unit 102. The sensor unit 102 include two MIMO radar elements (denoted by R) 126-1, 126-2 for radar mode sensing. An example sensor unit includes a location tracking unit 127. An example location tracking unit 127 includes an inertial measurement unit (IMU) 128 and a global positioning sensor (e.g. global navigation satellite system (GNSS)) 129, An example sensor unit 102 includes stereo vision sensor that includes a left monocular camera 132L and a right monocular camera 132R (each monocular camera is denoted by V) for vision mode sensing. The sensor unit 102 includes two processors (denoted by P) 120-1, 120-2 to locally process, at least partially, sensor mode information that is locally sensed using different local sensor modes. The example location tracking unit 127 provides a precise global location for the radar sensor unit 102. The geometric position of the sensor unit 102 within a geometric arrangement of multiple sensor units can vary by small amounts due to motion, such as vibration, of the platform on which the senor unit 102 is mounted, for example. The location tracking unit 127 can accurately determine the relative position of the sensor unit 102 despite such disturbances. The stereoscopic vision sensor 132L, 132R can be mounted to share a vision field of view with the radar fields of view of the radar elements 126-1, 126-2. An example vision system 132L, 132R is operably coupled to one or more of the processors 120-1, 120-2 to provide a classifier trained through machine learning, for example, to classify different objects (e.g., person, bicycle, car). The example vision system 132L, 132R is operably coupled to one or more of the processors 120-1, 120-2 to provide bounding boxes that can be used to detect salient objects within a radar field of view of the radar elements 126-1, 126-2.

Sensor Module Motion Compensation During Fusion of Wide Radar Aperture

Figure 7:
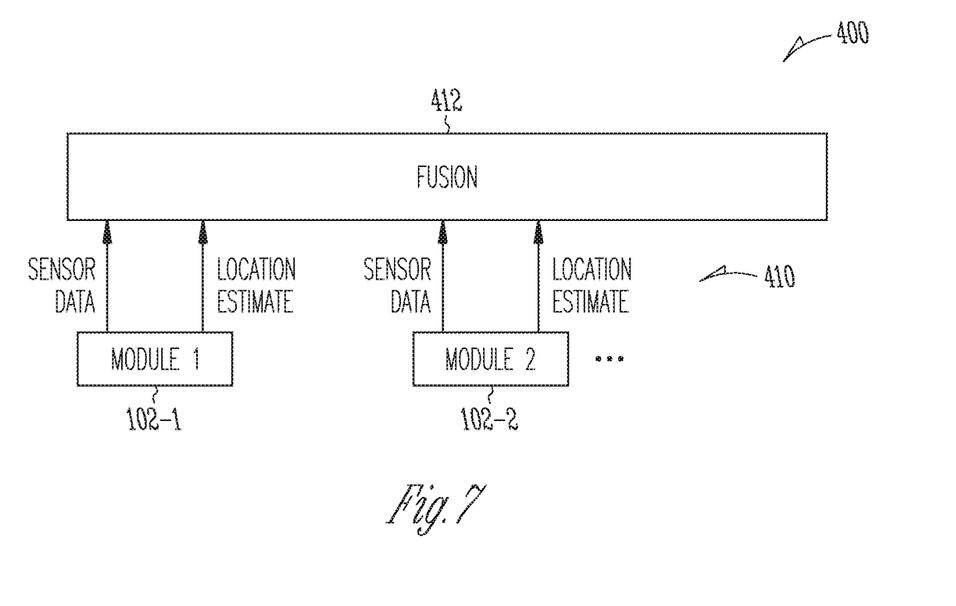
FIG. 7 is an illustrative block diagram showing of an example multimodal, sensing, fusion and feedback system for machine perception.

FIG. 7 is an illustrative block diagram showing of an example multimodal, sensing, fusion and feedback system 400 for machine perception. The example system 400, which also is referred to herein as the 'perception system' 400, includes multiple multimodal sensor units 102 geometrically distributed in a predetermined geometric arrangement at locations on a mobile platform (e.g., vehicle, drone, robot, etc.). The perception system 400 includes a fusion circuit block 412, also referred to herein as a 'fusion block'. The perception system 400 includes a high-speed communication network 410 operably coupled to provide communication between the sensor units 102 and the fusion block 412 configured to produce a large radar aperture based upon radar information provided smaller radar apertures associated with the by the spatially distributed sensor units. An example perception system 400 includes sensor units 102 with radar elements 126-1, 126-2 that operate in a millimeter wave frequency range (e.g., 77-81 GHz for vehicular radar) and a high-speed communication network 410 that supports data rates of multiple Gigabits per second.

Individual sensor units 102 transmit radar data and location estimates over the network 410 to the fusion block 412. The fusion block 412 fuses the radar data provided by the individual sensor units 102 to produce a large effective radar aperture representation of a scene. The fusion block 412 uses the location estimation information provided by the individual sensor units 102 to determine an effective geometric relationship among the individual sensor units 102 despite physical perturbations of a platform on which the sensor units are mounted. In other words, the fusion block 412 uses the location estimates to reduce the impact of perturbations upon the accuracy of fusion of the individual radar data to produce a wide aperture scene estimate. Thus, the fusion unit 412 produces an accurate wide area scene estimate despite variations in the geometric relationships among the sensor units 102.

More specifically, the radar elements 126-1, 126-2 of the individual sensor units 102 produce radar data that includes delay information, Doppler information, microDoppler information, and phase information. Small changes in the relative geometric locations of the sensor units 102 due to vehicle vibration can create perturbations in the relative radar measurements across the sensor units. The individual location tracking units 127 in the individual sensor units 102 track individual sensor unit motion, including micro-motions due to vibration, with near absolute position and velocity measurements. The fusion block 412 uses position measurements provided by the location tracking units 127 of individual sensor units to accurately determine the relative geometric positions of the sensor units 120 to reduce the effect of perturbations on the relative radar measurements by individual sensor units 102 upon the fusion of the radar data provided by the different sensor units to thereby accurately synthesize a large aperture radar scene.

Location tracking units 127 at the sensor units 102 determine respective actual locations of the respective sensor units 102. Actual senor unit locations relative to a platform on which the sensor units are mounted and relative to other sensor units can vary from nominal relative locations of the sensor unit 102 due to vibration, for example. The sensor units 102 send the actual location information to the fusion unit 412, which determines for each sensor unit, a difference between nominal location and actual location. A predetermined frame of reference, such as nominal locations of sensor units on a platform provides, nominal sensor unit locations. The fusion unit 412 fuses radar data to produce a wide radar aperture from the multiple sensor units 102 based at least in part upon respective nominal geometric relationships (known based upon nominal sensor locations at the platform) and respective location sensor-based differences, determined for sensor units, between nominal and actual sensor unit locations.

Figure 8:
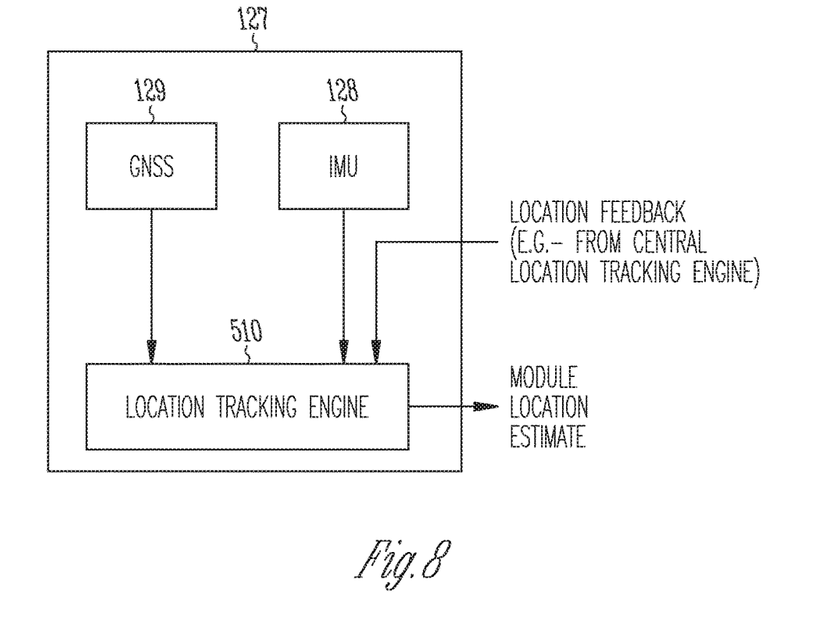
FIG. 8 is an illustrative block diagram showing a certain detail of a location tracking unit.

FIG. 8 is an illustrative block diagram showing a certain detail of a location tracking unit 127. An example location tracking unit includes an IMU 128, a global positioning sensor (GPS) 129 and a location tracking engine 510. An example IMU 128 includes one or more accelerometers and one or more gyroscopes (not shown). In operation, for example, an IMU 128 can track individual motion of a sensor unit 102 while global positioning sensor 129 can provide absolute position and velocity information used to calibrate out accelerometer and gyroscope bias. An example location tracking engine 127 includes one or more processors 120-1, 120-2 configured using program instructions 1324 to perform a location tracking process to track location of a sensor unit 102 in which the location tracking unit 127 is a component, based at least in part upon sensor information provided by the IMU 128 and the GPS 129. An example location tracking process involves use of one or more of Kalman filters, Extended Kalman filters, Unscented Kalman filters, or particle filters. The location tracking unit 127 provides as output information an estimate of location of its sensor unit. An example location estimate can include an absolute position of sensor unit, or alternatively, a location of the sensor unit relative to a fixed point on a mobile platform on which the sensor unit is mounted. Moreover, an example location estimate also can include derivatives of sensor unit position such as velocity and acceleration. An example location tracking unit 127 also can receive as input, feedback information from other sources, such as a centralized location of a platform produced, based upon one or more of odometry, GNSS and IMU which may be separate from the IMU units on of the respective sensor units.

Referring again to FIG. 7, the fusion block 412 uses location estimates received from the multiple sensor units 102 to estimate the real-time geometric arrangement of the sensor units 102. The fusion block 412 uses the estimated sensor unit locations along with the sensor radar data received from the sensor units 102 to create a scene representation that includes positions, velocities and classes of salient objects, accounting for the micro-motion of each module. In an example fusion block, estimated ego-motion of the platform is used to synthesize a radar scene. Platform ego motion can be determined, for example, based upon one or more of odometry, GPS and an IMU unit (not shown), which can be separate from the IMU units located at the sensor units.

Figure 9:
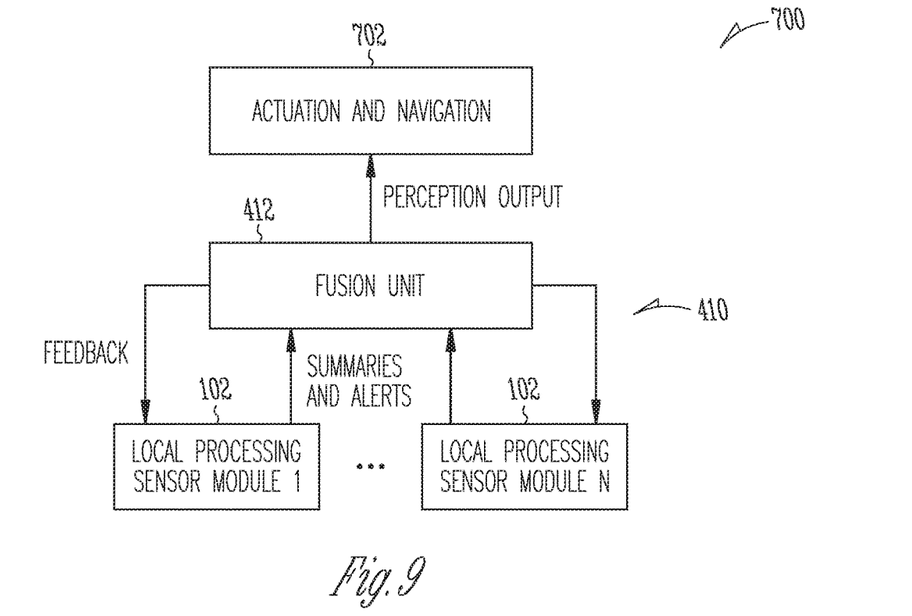
FIG. 9 is an illustrative block diagram showing an example perception architecture.

FIG. 9 is an illustrative block diagram showing an example perception architecture 700. Individual sensor units 102 produce summaries and alerts and send them over the high-speed communication links 410 to the fusion unit 412. The fusion block 412 sends feedback information to the sensor units 102 over the high-speed links 410. The fusion unit 412 generates perception output information to an actuation and navigation unit 702, such as steering control and/or braking control of a mobile platform, such as an automobile, for example.

Figure 10:
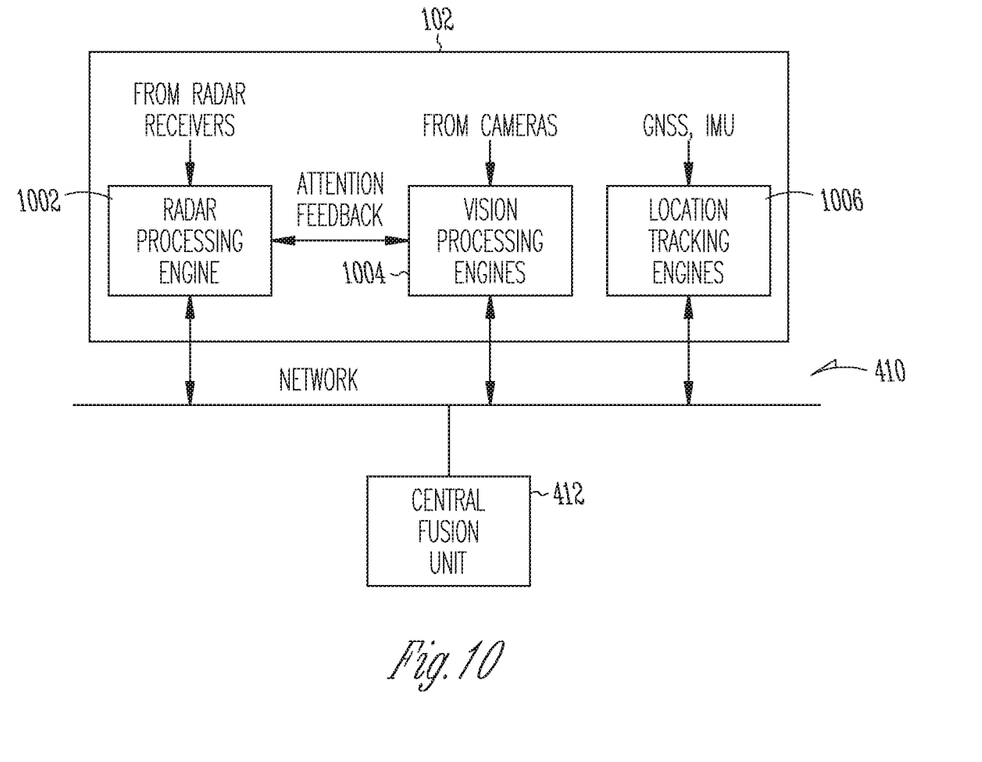
FIG. 10 is an illustrative block diagram showing radar, vision, and location tracking within an example sensor unit in communication with a fusion block.

FIG. 10 is an illustrative block diagram showing radar, vision, and location tracking within an example sensor unit 102 in communication with an example fusion block 114. The following description is applicable to each of the multiple sensor units 102. The processing units 120-1, 120-2 of the sensor unit 102 are configured with program instructions to act as a local radar processor engine 1002 to process radar data received by one or more radar elements 126-1, 126-2 of the sensor unit 102, to extract range-Doppler summaries. Local radar processing over a longer time-scale extracts microDoppler for salient objects being tracked. The processing units 120-1, 120-2 of the sensor unit 102 are configured with program instructions to act as a local vision processing engine 1004 to process local vision data received by one or more vision elements 132L, 132R of the sensor unit 102, to extract bounding boxes for salient objects and classifies these objects, for example. The processing units 120-1, 120-2 of the sensor unit 102 are configured with program instructions to act as a local location tracking engine 1006 to track the micromotion of the sensor unit 102 using data from the location tracking unit 127. The sensor unit 102 sends output data produced by the radar processor engine 1002, vision processor engine 1004, and location tracking engine 1006 over the network 410 to the fusion block 412, which fuses this information and provides feedback to the individual modules. The local processing operations in the individual sensor units can utilize this feedback to adjust their processing to focus on a particular local region of a radar scene, for example.

An output provided by the radar processor engine 1002 includes radar data summaries. For a point target and single antenna radar, for example, a radar summary can include simply a range and Doppler estimate, along with associated uncertainties. Thus, both the range and Doppler can be modeled as jointly Gaussian random variables with means corresponding to the estimates and covariances corresponding to the uncertainties in the estimates. For more complex targets (e.g., modeled as extended objects), for example, a radar summary can be expressed as a Gaussian mixture model in range/Doppler space. For MIMO radar units, for example, a more sophisticated summary in range/Doppler/angle space can be produced. The covariance matrices associated with Gaussian or Gaussian mixture models is typically not white. For example, if the integration time used to produce a radar data summary is small, as might be the case if the objective is rapid object detection, then the uncertainty in the Doppler domain can be large. If the integration time is larger, as can be the case for higher-resolution imaging of distant objects, then the uncertainty in Doppler estimation is reduced. For rapid response (e.g., to nearby objects which may result in a potentially dangerous situation), the radar data summaries can include an alert that includes range information acquired over a short time scale. In this case, the associated Doppler information can be missing or very coarse.

An output provided by the vision processor engine 1004 includes vision data information acquired by vision sensors 132L, 132R. Standard neural networks, or deep learning, on monocular images can be used to produce image bounding boxes and image object classifiers. Stereo vision when available, can be used to estimate the depth to associate with bounding boxes. The vision summaries sent to the fusion block 412 based upon information provided by the vision sensors can include location and size of bounding boxes for salient objects, and estimates of the class (e.g., pedestrian, automobile, bicycle) of these objects. The fusion block 412 can use the vision information to supplement the radar data summaries to produce more accurate scene information such as more accurate identification of salient objects.

The radar processor engine 1002 and the vision processor engine 1004 are coupled for attention feedback between them. The radar processor engine 1002 can provide radar-based information to the to the vision processor engine 1004 to provide cues as to where objects may be in a vision scene of the sensor unit 102. Conversely, the vision processor engine 1004 can provide vision-based information to the to the radar processor engine 1002 to provide cues as to where objects may be in a radar scene of the sensor unit 102.

Figure 11:
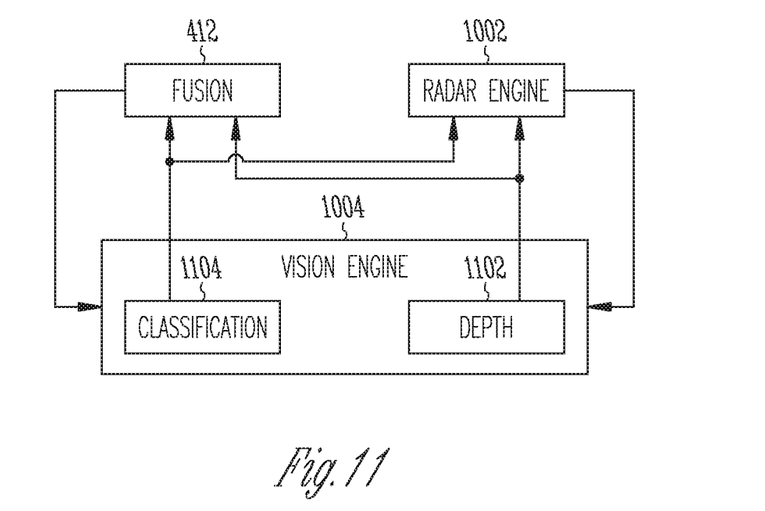
FIG. 11 is an illustrative block diagram showing certain detail of attention feedback among radar processor engine, vision processor engine, and fusion block.

FIG. 11 is an illustrative block diagram showing certain detail of attention feedback among radar processor engine 1002, vision processor engine 1004, and fusion block 412. The vision processor engine 1004 includes a depth detection engine 1102 and the classification engine 1104, which are operably coupled so that that the depth detection engine 1102 can provide information to the classification engine 1104 and so that the classification engine 1104 can provide information to the depth detection engine 1102. The vision processor engine 1004 is operably coupled to receive feedback information from the radar processor engine 1002 and to receive feedback information from the fusion block 412, which can include hints to use for classification and/or depth determination, for example. Conversely, the vision processor engine 1004 is operably coupled to the radar processor engine 1002 and to the fusion block 412 to provide vision information that can include hints to use for radar detection and/or depth radar data fusion, for example.

Feedback from the fusion block 412 is used in various aspects of local processing in the sensor units 102. For example, fused information produced by the fusion block 412 can be fed back to the sensor units 102 for use to predict trajectory of a salient object, and hence its location in range-Doppler space for a given radar unit, or its location in the image plane for a given camera. Feedback regarding these predicted locations can be used to trigger attention-based radar and vision computations at local processors. For example, the fusion unit 412 can predict that a salient object initially detected by forward-looking modules will appear towards the side of the vehicle in the next frame, and trigger attention-based processing by a side-looking module. For example, fused information produced by the fusion block 412, together with statistical modeling of radar cross-section and propagation, are used to detect the presence of salient objects with statistical guarantees on detection performance. This can be used to select bounding boxes in the images obtained from the vision system for processing, thus enhancing detection and classification performance by the vision system. For example, fused information produced by the fusion block 412 regarding vehicle ego-motion can be used to enhance tracking performance of location tracking unit 127 in individual sensor units.

Figure 12:
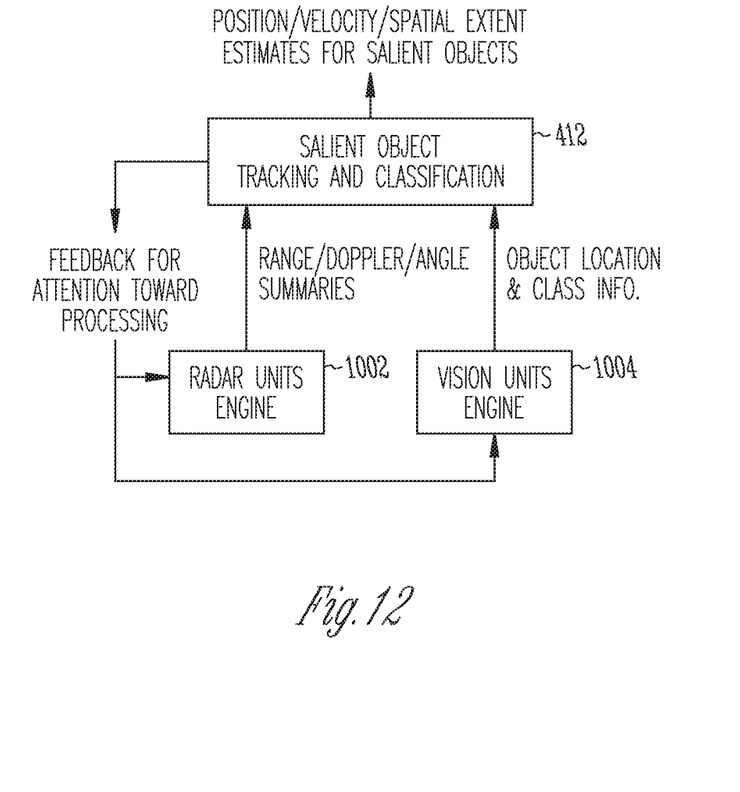
FIG. 12 is an illustrative block diagram showing an example configuration of the radar processor engine, vision processor engine, and fusion block.

FIG. 12 is an illustrative block diagram showing an example configuration of radar processor engines 1002, vision processor engine 1004, and fusion block 412. It will be appreciated that although only a single radar processor engine 1002 and a single vision processor engine 1004 of a single sensor unit 102 is shown, the following description is applicable to multiple sensor units. An example fusion block 412 uses the information obtained from the sensor units 102 to create a scene representation with the positions, velocities and classes of salient objects. Scene information can include information provided by radar processor engines 1002 on range, Doppler and microDoppler, and can include information provided by vision processor engines 1004 on object location, size and class, and information provided by location tracking engines 1006 on the micromotion of each sensor unit 102. The fusion unit 412 also can utilizes centralized information such as the estimated ego-motion of an example vehicle (based on standard instrumentation including odometry, GNSS and IMU which may be separate from the IMU units on the sensor units).

An example output of radar fusion in the fusion block 412 includes a radar snapshot of the scene. For a subset of important objects capable of motion (e.g., pedestrians, other vehicles), these can serve as measurements in a system for dynamical tracking, using state space models which account for ego motion (i.e., the known motion of the vehicle on which the system is deployed). A number of techniques, such as Kalman filter, extended Kalman filter, unscented Kalman filter, or different variants of the particle filter, can be used for such dynamical tracking. For other objects which are stationary (e.g., highway barriers), successive snapshots can be stitched together using simpler techniques which account for ego motion and employ Synthetic Aperture Radar (SAR) techniques that exploit the motion of the sensor units 102, which is known.

The fusion block 412 also can fuse alerts and associated range information, from multiple radar units from one or more sensor units 102, as well as potentially from vision units, to produce a fused alert with additional information. The additional information can include the relative location of an object triggering the alert, and possibly the class of the object (e.g., based on vision data).

The fusion block 412 can utilize multiple modes of information from multiple sensor units 102, which may include both radar and vision information. The radar and vision units of a sensor unit 412 have a common geometric frame of reference, (e.g., as explained with reference to FIGS. 1A-5), which can enable probabilistic fusion of objects detected by the two systems. An approximate initial estimate of the common frame of reference is obtained by the known geometry of the sensor deployment on the mobile platform. However, the fusion block 412 can provide feedback to sensor units 102 based upon a scene fused by the fusion block 412 for use by a sensor unit 102 to continually to tune parameters of a geometric frame of reference, including both camera and radar parameters. Detection performance of radar for important objects (e.g., pedestrians, bicycles, vehicles), in terms of the tradeoffs between false alarm and miss probabilities, can be quantified using physics-based models of link budget (which includes the impact of transmit power, receive noise figure, range) and radar cross-section. Thus, radar-based detection can be weighted more heavily than vision-based detection for detection of significant objects. The deep learning-based classifier in the vision system is used to provide labels for these objects. The labels are revised dynamically based on the output of the vision- and radar-based classifiers.

Computing Machine

Figure 13:
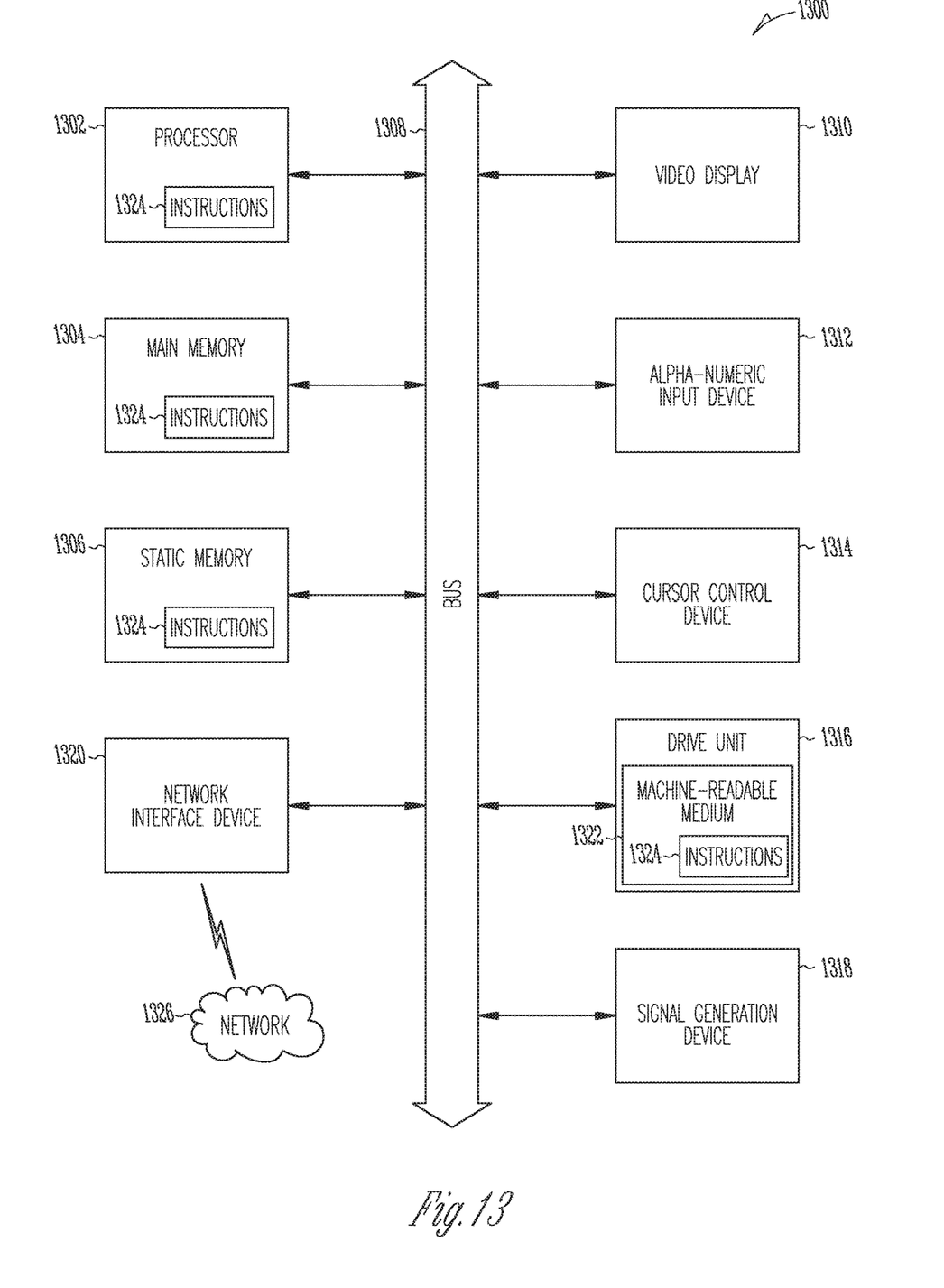
FIG. 13 is an illustrative block diagram of a computing machine.

FIG. 13 is an illustrative block diagram of a computing machine. As used herein, the phrase "computing machine" encompasses its plain and ordinary meaning. A "computing machine" may include one or more computing machines. A computing machine may include one or more of a server, a data repository, a client device, and the like. A client device may include a laptop computer, a desktop computer, a mobile phone, a smart watch, a tablet computer, a smart television, a personal digital assistant, a digital music player, and the like. A computing machine may be any device or set of devices that, alone or in combination, includes processing circuitry and memory.

Each sensor unit 102 can comprise a different instance of the computing machine 1300 as can the fusion block 412. In some embodiments, the computing machine 1300 operates as a standalone device or may be connected (e.g., networked) to other computers. In a networked deployment, the computing machine 1300 can operate in the capacity of a server or a client computer in a server-client network environment, or as a peer computer in a peer-to-peer (or distributed) network environment, for example.

The example computing machine 1300 includes a hardware processor 1322 (e.g., a central processing unit (CPU), a graphics processing unit (GPU) or both), main memory 1304 and static memory 1306, which communicate with each other via bus 1308. A disk drive unit 1326, which can act as data storage 1325, includes computer-readable storage device 1322 on which is stored one or more sets of instructions and data structures (e.g., software 1324) embodying or utilized by any one or more of the methodologies or functions described herein. The software 1324 may also reside, completely or at least partially, within a computer readable storage device such as the main memory 1304 and/or within the processor 1322 during execution thereof by the computing machine 1300, the main memory 1304 and the processor 1322 also constituting non-transitory computer-readable media. The software 1324 can further be transmitted or received over network 1326 via a network interface device 1320 utilizing any one of a number of well-known transfer protocols (e.g., HTTP).

The processing system 1302 is operably coupled to non-transitory computer readable media, 1304, 1306 and 1316. The non-transitory computer readable media store a plurality of instructions that are accessible to, and executable by, the processing system 1302. The plurality of instructions include instructions that when executed, configure the computing machine 1300 to implement the radar processing engine 1002, vision processing engine 1004, location detection engine 1006, depth engine 1105, classification engine 1106, and to configure one or more processors of the fusion block 412 to perform radar data fusion, synthesis of a wide aperture scene, dynamical and static object tracking, for example.

The above description is presented to enable any person skilled in the art to create and use a robust radar-centric perception system. Various modifications to the examples will be readily apparent to those skilled in the art, and the generic principles defined herein may be applied to other examples and applications without departing from the scope of the invention. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals are used in some places to represent different views of the same or similar items in different drawings. Thus, the foregoing description and drawings of embodiments and examples are merely illustrative of the principles of the invention. Therefore, it will be understood that various modifications can be made to the embodiments by those skilled in the art without departing from the scope of the invention, which is defined in the appended claims.

The invention claimed is:

1. A radar sensor system comprising:
multiple respective sensor units disposed upon a mobile platform such that the respective sensor units have respective nominal geometric relationships with one another;
a centralized processor;
a communication network to communicate information between the multiple respective sensor units;
wherein respective sensor units include,
a respective radar receiver to receive respective radar data representing a respective radar scene associated with the respective sensor unit;
a respective location sensor that determines a respective actual location of the respective radar receiver and that produces respective location sensor-based information indicative of the respective actual location;
a respective local processor operably coupled to a respective local non-transitory computer readable medium, the respective local non-transitory computer readable medium comprising a respective first plurality of instructions stored in association therewith that are accessible to, and executable by, the respective local processor, wherein the respective plurality of instructions includes;
instructions that, when executed, send at least a respective portion of the respective radar data and the respective location sensor-based information to the centralized processor;
wherein the centralized processor is operably coupled to a second non-transitory computer readable medium, the second non-transitory computer readable medium comprising a second plurality of instructions stored in association therewith that are accessible to, and executable by, the centralized processor, wherein the second plurality of instructions includes:
instructions that, when executed, use the respective location sensor-based information to determine respective differences between respective sensor nominal locations and respective sensor actual locations and to use the respective determined differences to fuse the respective portions of the radar data received over the network from respective sensor units to produce a wide radar aperture.

2. The radar sensor system of claim 1,
wherein the respective nominal geometric relationships include multiple sensor units disposed upon the mobile platform in horizontal alignment.

3. The radar sensor system of claim 1,
wherein the respective nominal geometric relationships include multiple sensor units are disposed upon the mobile platform in vertical alignment.

4. The radar sensor system of claim 1,
wherein the respective nominal geometric relationships include multiple sensor units disposed upon the mobile platform facing parallel to one another such that the respective radar scenes of the respective sensor units overlap.

5. The radar sensor system of claim 1,
wherein the respective nominal geometric relationships include multiple sensor units disposed upon the mobile platform with at least two of the respective sensors facing at an angle to one another.

6. The radar sensor system of claim 1,
wherein the respective nominal geometric relationships include multiple sensor units disposed upon the mobile platform with at least two of the respective sensors being separated vertically from one another.

7. The radar sensor system of claim 1,
wherein the respective nominal geometric relationships include at least two of the respective sensors disposed upon the mobile platform angled downward at respective acute angles.

8. The radar system of claim 1,
wherein the respective radar receivers sample a radar waveform having a respective radar wavelength to receive the respective radar data; and
wherein respective sensor units are separated from all other sensor units by at least fifty times the respective radar wavelength.

9. The radar system of claim 1,
wherein respective sensor units include,
a respective vision sensor that is positioned to capture a respective image within a respective vision sensor field of view that overlaps the respective radar scene and that produces respective vision sensor-based information indicative of the respective captured image;
wherein the respective first plurality of instructions includes:
instructions that, when executed, send the respective vision sensor-based information to the centralized processor; and
wherein the second plurality of instructions includes:
instructions that, when executed, use the respective vision sensor-based information to determine respective differences between respective sensor nominal locations and respective sensor actual locations and to use the respective determined differences to fuse the respective portions of the radar data received over the network from respective sensor units to produce a wide radar aperture.

10. A radar sensor system comprising:
multiple respective sensor units disposed upon a mobile platform such that the respective sensor units have respective nominal geometric relationships with one another;
a centralized processor;

a communication network to communicate information between the multiple respective sensor units;

wherein respective sensor units include, a respective radar receiver to receive respective radar data representing a respective radar scene associated with the respective sensor unit;

a respective vision sensor that is positioned to capture a respective image within a respective vision sensor field of view that overlaps the respective radar scene and that produces respective vision sensor-based information indicative of the respective captured image;

a respective local processor operably coupled to a respective local non-transitory computer readable medium, the respective local non-transitory computer readable medium comprising a respective first plurality of instructions stored in association therewith that are accessible to, and executable by, the respective local processor, wherein the respective plurality of instructions includes:

instructions that, when executed, send at least a respective portion of the respective radar data and the respective vision sensor-based information to the centralized processor;

wherein the centralized processor is operably coupled to a second non-transitory computer readable medium, the second non-transitory computer readable medium comprising a second plurality of instructions stored in association therewith that are accessible to, and executable by, the centralized processor, wherein the second plurality of instructions includes:

instructions that, when executed, use the respective vision sensor-based information to determine respective differences between respective sensor nominal locations and respective sensor actual locations and to use the respective determined differences to fuse the respective portions of the radar data received over the network from respective sensor units to produce a wide radar aperture.

11. The radar sensor system of claim 10,
wherein the respective nominal geometric relationships include multiple sensor units disposed upon the mobile platform in horizontal alignment.

12. The radar sensor system of claim 10,
wherein the respective nominal geometric relationships include multiple sensor units are disposed upon the mobile platform in vertical alignment.

13. The radar sensor system of claim 10,
wherein the respective nominal geometric relationships include multiple sensor units disposed upon the mobile platform facing parallel to one another such that the respective radar scenes of the respective sensor units overlap.

14. The radar sensor system of claim 10,
wherein the respective nominal geometric relationships include multiple sensor units disposed upon the mobile platform with at least two of the respective sensors facing at an angle to one another.

15. The radar sensor system of claim 10,
wherein the respective nominal geometric relationships include multiple sensor units disposed upon the mobile platform with at least two of the respective sensors being separated vertically from one another.

16. The radar sensor system of claim 10,
wherein the respective nominal geometric relationships include at least two of the respective sensors disposed upon the mobile platform angled downward at respective acute angles.

17. The radar system of claim 10,
wherein the respective radar receivers sample a radar waveform having a respective radar wavelength to receive the respective radar data; and
wherein respective sensor units are separated from all other sensor units by at least fifty times the respective radar wavelength.

18. A method to produce a wide radar aperture comprising:

placing multiple respective sensor units that each includes a respective radar receiver and a respective location sensor at respective nominal locations of a mobile platform such that the respective sensor units have a nominal geometric relationship;

at each of the multiple sensor units, receiving respective radar data at the respective radar receivers at respective sensor units representing respective radar scenes associated with the respective sensor units;

at each of the multiple sensor units, using respective location sensors at respective sensor units to determine respective actual locations of the respective sensor units;

determining for one or more of the multiple respective sensor units, a respective location sensor-based difference between the respective sensor unit nominal location and the respective sensor unit actual location;

fusing respective radar data received at the multiple respective sensor units based at least in part upon the respective nominal geometric relationships and respective location sensor-based differences determined for the one or more of the multiple respective sensor units, between respective sensor unit nominal location and respective sensor actual location, to produce the wide radar aperture.

19. The method of claim 18,
wherein the nominal geometric relationship includes the multiple sensor units disposed upon the mobile platform in horizontal alignment.

20. The method of claim 18,
wherein the nominal geometric relationship includes the multiple sensor units are disposed upon the mobile platform in vertical alignment.

21. The method of claim 18,
wherein the nominal geometric relationship includes the multiple sensor units disposed upon the mobile platform facing parallel to one another such that the respective radar scenes of the respective sensor units overlap.

22. The method of claim 18,
wherein the nominal geometric relationship includes the multiple sensor units disposed upon the mobile platform with at least two of the respective sensors facing at an angle to one another.

23. The method of claim 18,
wherein the respective nominal geometric relationships include multiple sensor units disposed upon the mobile platform with at least two of the respective sensors being separated vertically from one another.

24. The method of claim 18,
wherein the nominal geometric relationship includes at least two of the respective sensors disposed upon the mobile platform angled downward at respective acute angles.

25. The method of claim 18,
wherein receiving the respective radar data includes respectively sampling a radar waveform having a respective radar wavelength; and wherein the nominal geometric relationship includes the respective sensor units being separated from all other sensor units by at least fifty times the respective radar wavelength.

26. The radar sensor system of claim 18,
wherein each respective sensor unit includes a respective vision sensor that is positioned to capture a respective image within a respective vision sensor field of view that overlaps a respective radar scene associated with the respective sensor unit that produces respective vision sensor-based information indicative of the respective captured image;
determining for one or more of the multiple respective sensor units, a respective vision sensor-based difference between the respective sensor unit nominal location and the respective sensor unit actual location based upon at least one or more comparisons of images captured at different respective sensors; and
wherein fusing respective radar data received at the multiple respective sensor units includes fusing based at least in part upon,
the respective nominal geometric relationships,
the respective location sensor-based differences determined for the one or more of the multiple respective sensor units, between respective sensor unit nominal location and respective sensor actual location, to produce the wide radar aperture, and
the one or more respective vision sensor-based differences between the respective sensor unit nominal location and respective sensor unit actual location.

* * * * *

UNITED STATES PATENT AND TRADEMARK OFFICE
CERTIFICATE OF CORRECTION

PATENT NO. : 11,885,906 B2  
APPLICATION NO. : 17/256564  
DATED : January 30, 2024  
INVENTOR(S) : Arbabian et al.

Page 1 of 1

It is certified that error appears in the above-identified patent and that said Letters Patent is hereby corrected as shown below:

In the Claims

In Column 11, Line 51, in Claim 1, delete "includes;" and insert --includes:-- therefor Signed and Sealed this  
Twenty-ninth Day of April, 2025

Coke Morgan Stewart  
*Acting Director of the United States Patent and Trademark Office*